US010795891B2

United States Patent
Miller et al.

(10) Patent No.: US 10,795,891 B2
(45) Date of Patent: Oct. 6, 2020

(54) DATA DEDUPLICATION FOR EVENTUAL CONSISTENCY SYSTEM AND METHOD

(71) Applicant: Neverfail Limited, Manchester (GB)

(72) Inventors: Kurt J. Miller, Port Washington, NY (US); Anthony Mulieri, Holbrook, NY (US); Shaun R. J. McDowell, Mineola, NY (US)

(73) Assignee: Neverfail Ltd. (GB)

( * ) Notice: Subject to any disclaimer, the term of this patent is extended or adjusted under 35 U.S.C. 154(b) by 565 days.

(21) Appl. No.: 15/646,619

(22) Filed: Jul. 11, 2017

(65) Prior Publication Data

US 2019/0018881 A1 Jan. 17, 2019

(51) Int. Cl.
| | |
|---|---|
| *G06F 16/00* | (2019.01) |
| *G06F 16/2455* | (2019.01) |
| *G06F 16/27* | (2019.01) |
| *G06F 11/00* | (2006.01) |
| *G06F 3/06* | (2006.01) |
| *H04L 29/08* | (2006.01) |

(52) U.S. Cl.
CPC ......... *G06F 16/24556* (2019.01); *G06F 3/06* (2013.01); *G06F 3/067* (2013.01); *G06F 3/0608* (2013.01); *G06F 3/0641* (2013.01); *G06F 11/00* (2013.01); *G06F 16/2455* (2019.01); *G06F 16/275* (2019.01); *H04L 67/1095* (2013.01); *H04L 67/1097* (2013.01)

(58) Field of Classification Search
CPC ................................. G06F 16/24556
See application file for complete search history.

(56) References Cited

PUBLICATIONS http://www.quantum.com/technologies/deduplicationreplication/index.aspxquantum.com quantum.com, Variable-Length Deduplication, website, pp. 1-5, United States/Canada.
http://storreduce.com/opendedup.org The Only Deduplication Engine Built for Cloud Object Storage, website, pp. 1-7, United States.
http://opendedup.org/odd/opendedup.org, Cloud Storage Gateway and File System, website, pp. 1-2.

*Primary Examiner* — Grace Park
(74) *Attorney, Agent, or Firm* — Taylor Russell & Russell, P.C.

(57) ABSTRACT

The present invention relates to a system and method for improving data deduplication for eventual consistent for distributed storage systems. Eventual consistency poses significant challenges for deduplication systems. This is because data storage is often spread over many different notes and up-to-date data may not always be available. A significant component of deduplication is creating pointers to older copies of identical data and deleting the later copy. In a basic implementation, this creates an eventually consistent vulnerability. If an older copy of the pointers to the data is retrieved (in the form of a metadata file), it may be pointing to a copy of the data that is no longer available. The present system and method solves the problem with eventual consistency vulnerabilities by introducing a level of indirection and creating manifest files for each file (vessel).

5 Claims, 7 Drawing Sheets

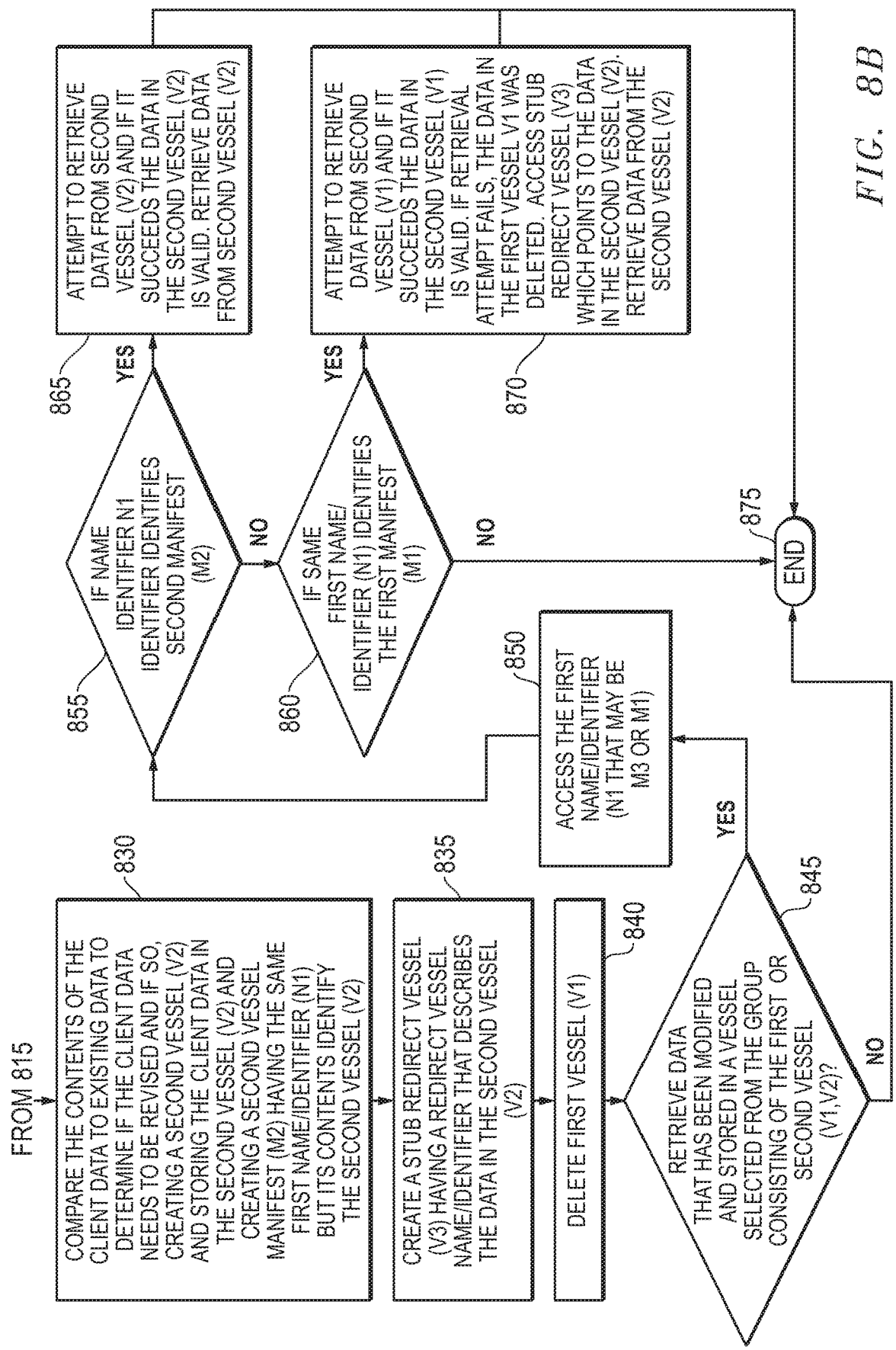

DATA DEDUPLICATION FOR EVENTUAL CONSISTENCY SYSTEM AND METHOD

BACKGROUND

Data deduplication is a specialized data compression technique for eliminating duplicate copies of repeating data. This technique is used to improve storage utilization and can also be applied to network data transfers to reduce the number of bytes that must be sent. In the deduplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency often varies with the chunk size), the amount of data that must be stored or transferred can be greatly reduced.

Data deduplication, also known as data optimization is to reduce the amount of required physical bytes are stored on the disk or the need for data transmitted over the network operation without compromising the fidelity and integrity of the original data. Data deduplication reduces the required storage capacity to store data, and may thus lead to data storage hardware costs and management costs savings. Data deduplication provides solutions handle fast-growing digital storage of data.

Data deduplication systems have challenges dealing with eventual consistency. This is because data storage is often spread over many different nodes and up-to-date data may not always be available. Eventually consistency is a model used in distributed storage systems. It means that for some period of time after an update (or delete) is made, the data from prior to the update (pre-update data) may still be returned in response to a retrieval access. Typically, there is an outside time limit, for example three days, beyond which the pre-update data will no longer be returned.

Eventual consistency poses significant challenges for deduplication systems. This is because data storage is often spread over many different nodes and up-to-date data may not always be available. A significant component of deduplication is creating pointers to older copies of identical data and deleting the later copy. In a basic implementation, this creates an eventually consistent vulnerability. If an older copy of the pointers to the data is retrieved (usually in the form of a metadata file), it may be pointing to a copy of the data that is no longer available. The present system and method solves the problem with eventual consistency vulnerabilities by introducing a level of indirection and creating manifest files for each file (vessel).

Techniques and mechanisms are provided here to improve data deduplication and deal with the problems of eventual consistency.

SUMMARY

The present solution addresses data deduplication limitations and deals with the problems of eventual consistency by adding a layer of indirection above the deduplicated data. When this layer is combined with a precisely ordered multi-step update process and the use of temporary redirection stub files, the result is a strongly consistent data repository out of the eventually consistent object storage. The present invention relates to a system and method for improving data deduplication for eventually consistent distributed storage systems. The present system and method solves the problem with eventual consistency vulnerabilities by introducing a level of indirection and creating manifest files for each file (vessel). The present invention comprises a computer-implemented method for synchronizing data between a server computer, a client computer and data storage accessible to the server computer to provide a strongly consistent data repository. The method comprises receiving a request to synchronize client data on the client computer with data in the data storage connected to the server computer; breaking the client data to be stored in the data storage connected to the server computer into pieces; using the server computer, running an algorithm on the client data and comparing the client data to existing data in the data storage to determine if the client data is already exists in data storage; if the client data is not present in data storage, combining the client data into a grouping called a first vessel (V1), creating a first vessel manifest (M1) having a first name/identifier (N1) that identifies the first vessel (V1) and storing the first vessel and the first vessel manifest (M1) in the data storage and storing a pointer to the first vessel manifest (M1) in a first metadata file. If the client data is present in data storage, comparing the contents of the client data to existing data to determine if the client data needs to be revised and if so, creating a second vessel (V2) and storing the client data in the second vessel (V2) and creating a second vessel manifest (M2) having the same first name/identifier (N1) but its contents identify the second vessel (V2); creating a stub redirect vessel (V3) having a redirect vessel name/identifier that describes the data in the second vessel (V2); and deleting the first vessel (V1).

The present invention further comprises a computer-implemented method for synchronizing data between a server computer, a client computer and data storage accessible to the server computer to provide a strongly consistent data repository by retrieving data that has been modified and stored in a vessel selected from the group consisting of the first or second vessel (V1, V2) and accessing the first name/identifier (N1 that may be M2 or M1). If the same first name/identifier (N1) identifies the second manifest (M2), attempting to retrieve the data from the second vessel (V2) and if this retrieval succeeds, the data in the second vessel (V2) is valid. If the same first name/identifier (N1) identifies the first manifest (M1), attempting to retrieve the data from the first vessel (V1) and if this retrieval succeeds, the data in the first vessel (V1) is valid and retrieving data from the first vessel (V1). If the same first name/identifier (N1) identifies the first manifest (M1), attempting to retrieve the data from the first vessel (V1) and if this retrieval fails, the data in the first vessel (V1) was deleted and accessing the stub redirect vessel (V3) which describes the data in the second vessel (V2) and retrieving the data from the second vessel (V2).

BRIEF DESCRIPTION OF DRAWINGS

These and other features, aspects and advantages of the present invention will become better understood with regard to the following description, appended claims, and accompanying drawings wherein:

FIGS. 8a and 8b are flowcharts of an exemplary embodiment of a data deduplication system for eventual consistency object storage.

DETAILED DESCRIPTION OF INVENTION

Figure 1:
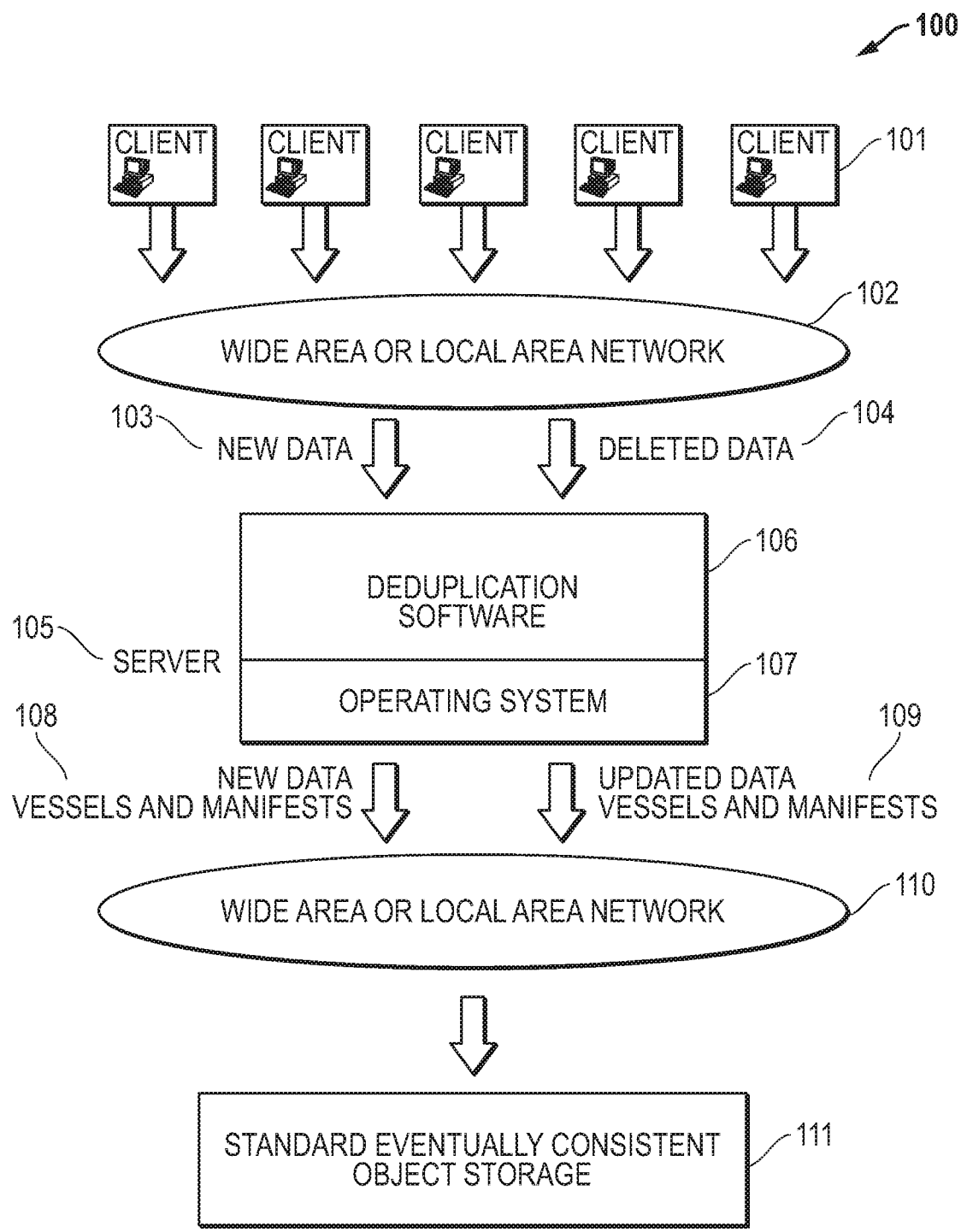
FIG. 1 illustrates an exemplary embodiment block diagram of the present system.

FIG. 1 depicts a computer system and network 100 suitable for implementing the system and method of the present system. A server computer 105 includes an operating system 107 for controlling the overall operation of the server 105 and the deduplication software 106 of the present solution. The server 105 may connect through a wide area or local area and communications network (wired or wireless) 102 to one or more client computers 101. The sever 105 may also connect via the same or another wide area or local area and communications network (wired or wireless) 110 to a standard eventually consistent object storage 111. The communications networks 102 and 110 may be a mixture of local or remote networks so some client computers 101 are local while others are remotely located. File systems volumes are configured on and shared from the server 105. The file system shares can be either networked attached storage (NAS) or common internet file system (CIFS) type shares.

Any data, new data 103 or deleted data 104 sent to the server 105 are processed through the deduplication software 106. The processing includes breaking the data into pieces, in this example approximately 20K each and running algorithms to determine if the same data is already present. If so pointers are used to prevent the need for storing the same data again. The result of the deduplication process is that data that needs to be added or deleted from the back-end object storage system, is combined into new or updated grouping called vessels 108, 109 with new or updated pointer indices called manifests 108, 109. The vessels and manifests 108, 109 are then written via a communications network 110 to local or remote standard eventually consistent object storage 111.

Figure 2:
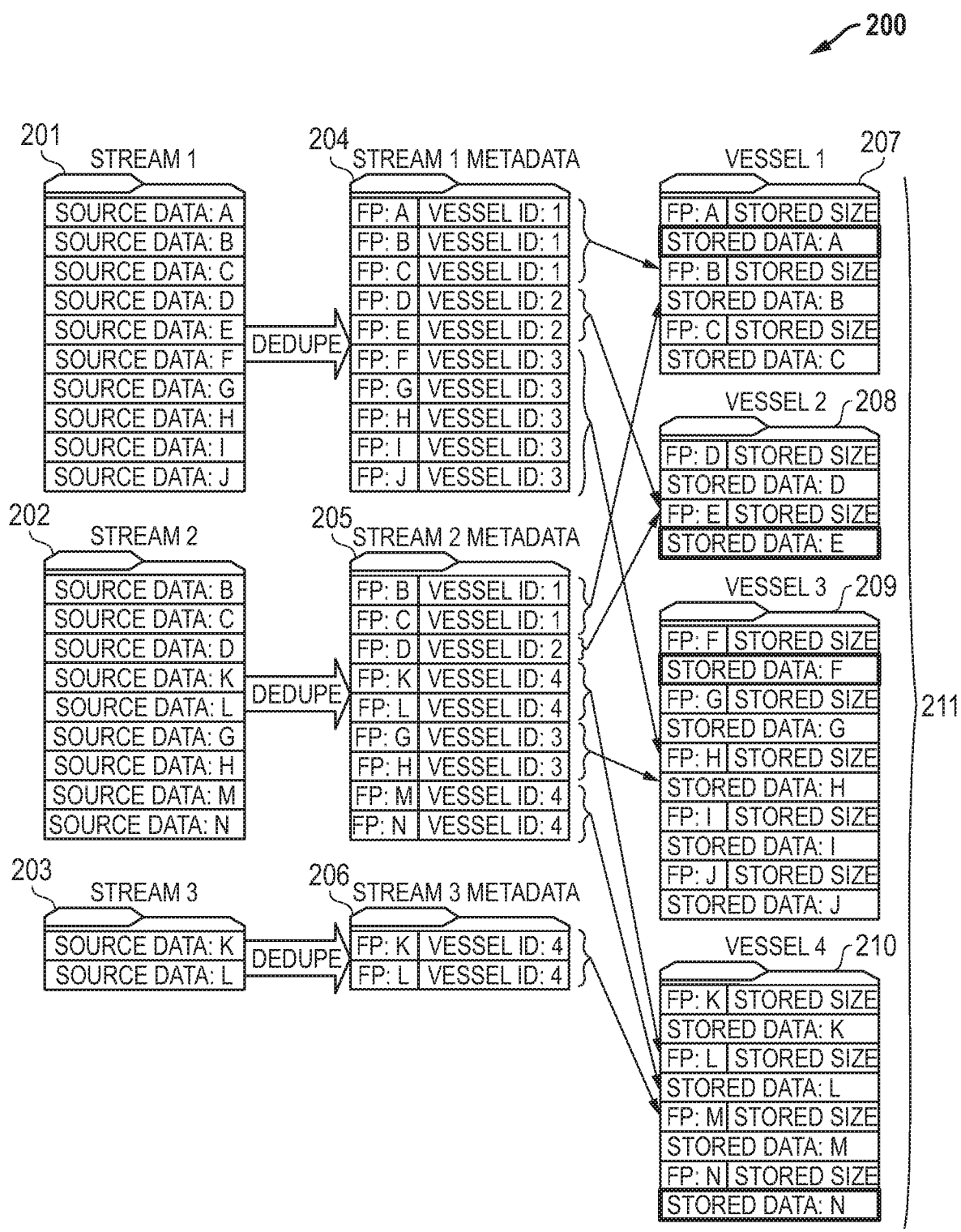
FIG. 2 is an exemplary embodiment of a data deduplication architecture diagram overview.

FIG. 2 is an overview of an exemplary embodiment of a data deduplication architecture diagram that depicts a design without the use of manifests. In this deduplication design 200, each source file 201, 202 and 203 is broken into segments of an average of twenty (20) KB in length. A hashing scheme is used to generate a unique fingerprint for the data in each segment 204, 205 and 206. Those segments are grouped together into a unit of approximately ten (10) MB and stored as a file (called a vessel 207, 208, 209, 210) in the storage system 211. For each source file, a metadata file 204, 205 and 206 containing the original location of each segment in the source file, the fingerprint and where the data for that fingerprint (i.e., segment) can be found in the storage.

Figure 3:
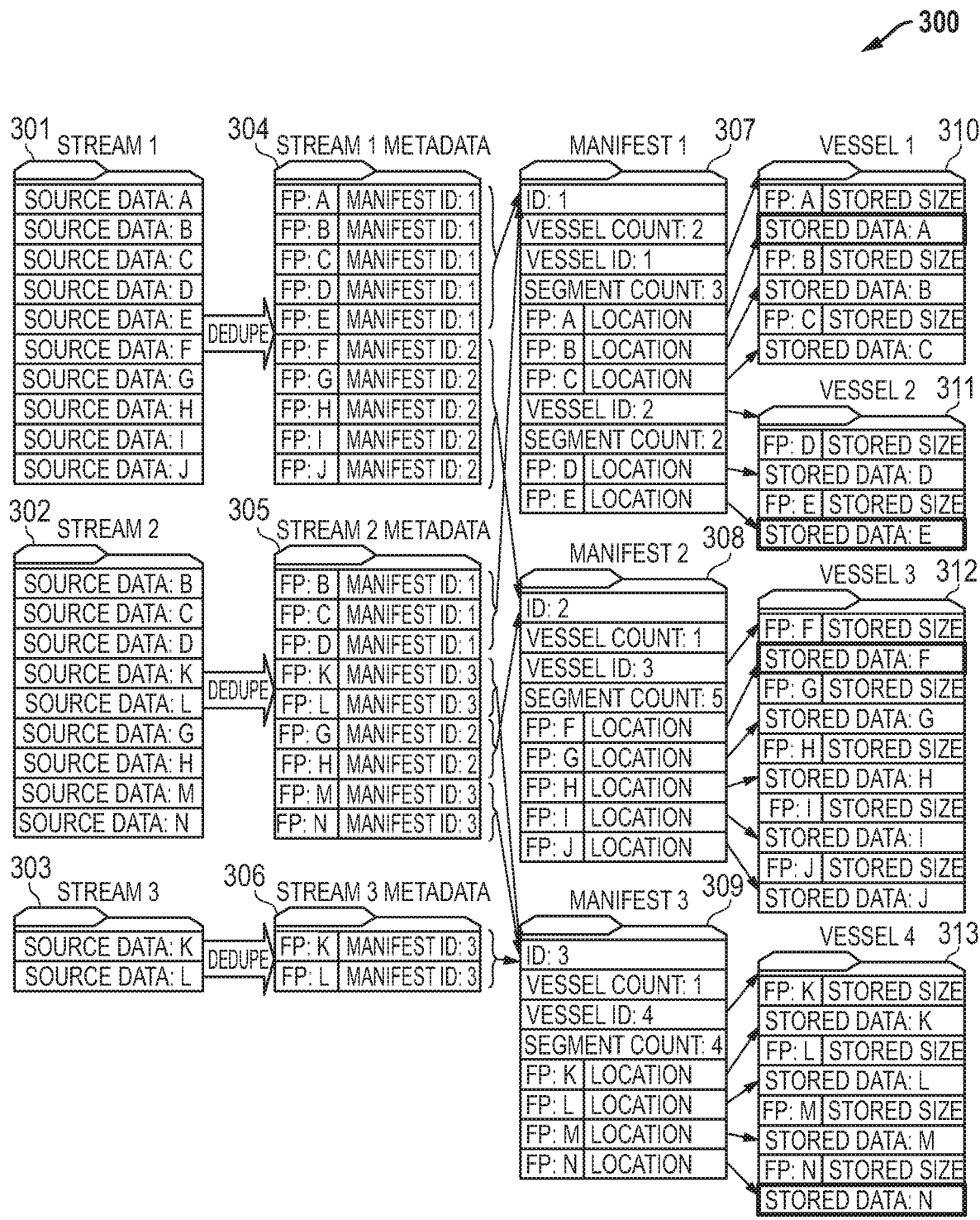
FIG. 3 is an overview of an exemplary embodiment of a data deduplication architecture diagram.

FIG. 3 is an overview of an exemplary embodiment of a data deduplication architecture diagram that depicts a design alternative which uses manifests. This deduplication design 300 is a modification of the design shown in FIG. 2. In this design 300, each source file 301, 302 and 303 is broken into segments of an average of twenty (20) KB in length. Rather than store an identification to the vessel containing the data as shown in FIG. 2, a level of indirection is introduced by creating a manifest file 307, 308 and 309 for each vessel 310, 311, 312 and 313. The manifest file identification is stored in the metadata file 304, 305 and 306, rather than the vessel file identification. The manifest file 307, 308 and 309 contains a list of fingerprints and their locations within a vessel including the vessel id 310, 311, 312 and 313. The addition of the manifests, by itself is not enough to allow deletions on an eventually consistent system, however it is a necessary step.

Figure 4:
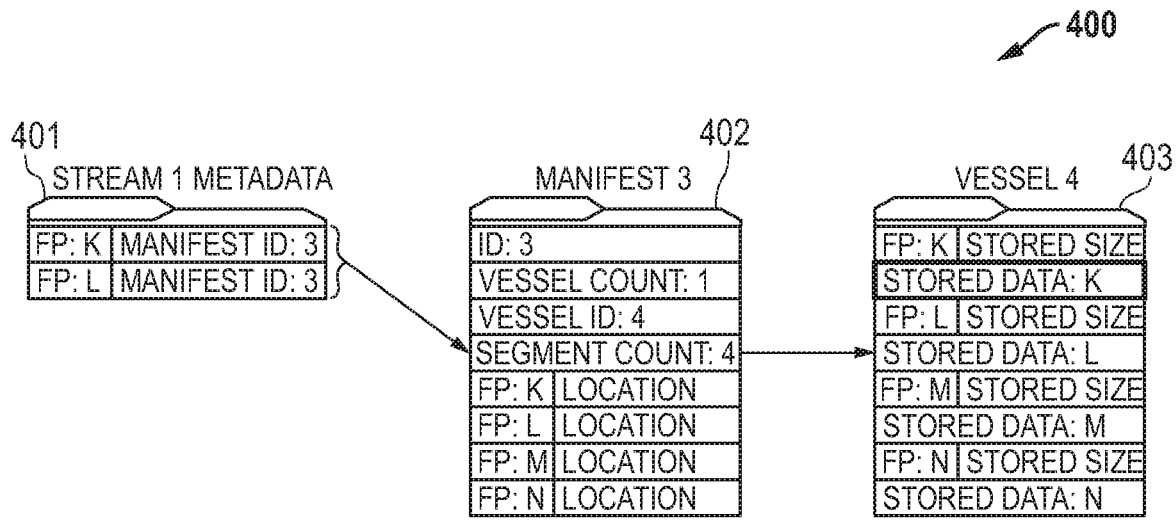
FIG. 4 is an overview of an exemplary embodiment of a data deduplication architecture diagram.
Figure 5:
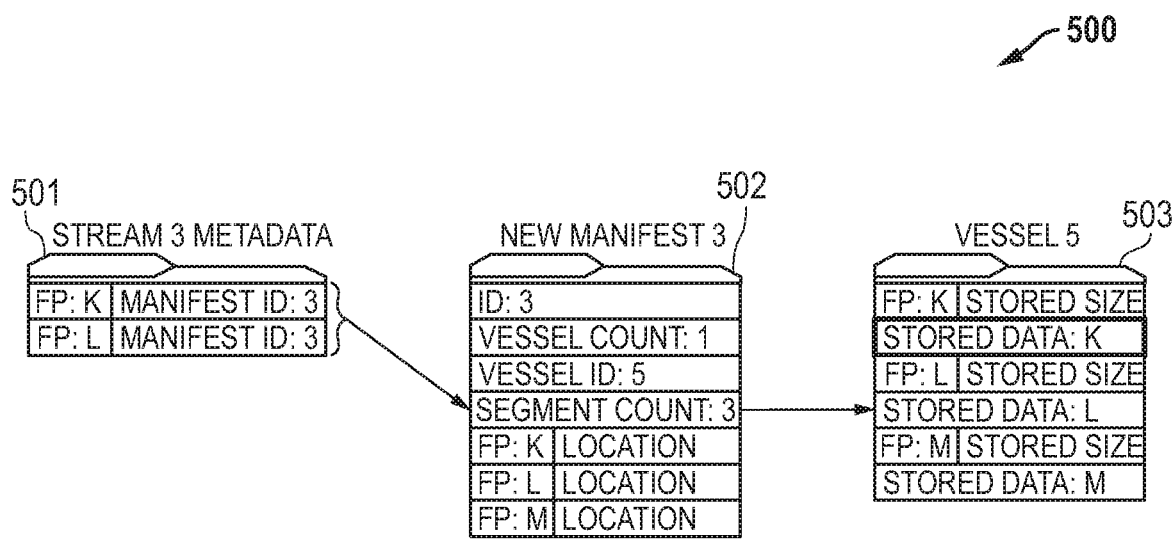
FIG. 5 is an overview of an exemplary embodiment of a data deduplication architecture diagram.
Figure 6:
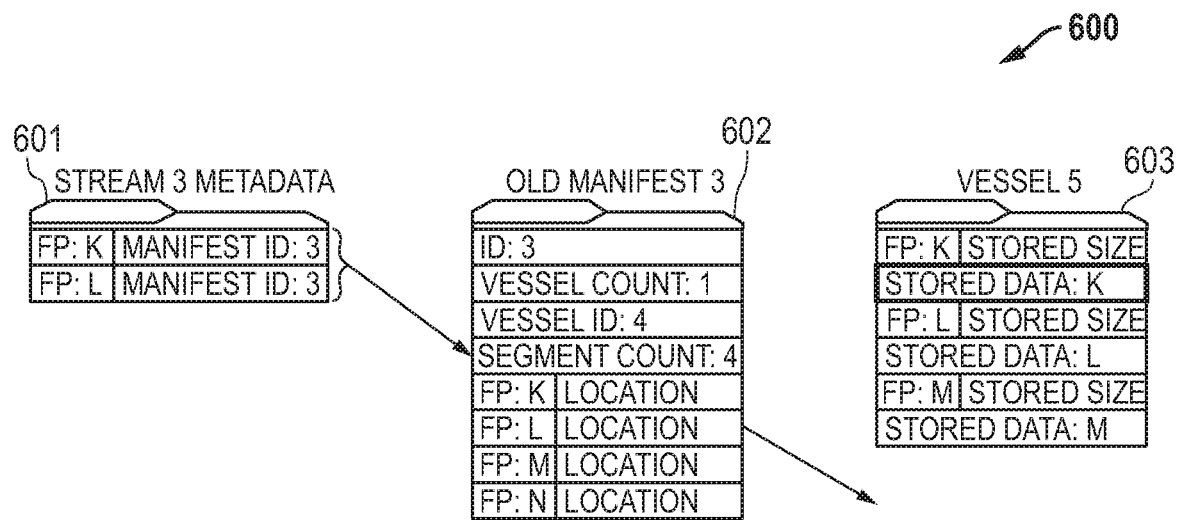
FIG. 6 is an overview of an exemplary embodiment of a data deduplication architecture diagram.

FIGS. 4, 5 and 6 are overviews of exemplary embodiments of a data deduplication architecture diagram. FIG. 4 depicts an exemplary embodiment of metadata and a manifest before deletion. FIG. 5 depicts an exemplary embodiment of a data retrieval where a new manifest has been retrieved. FIG. 6 depicts an exemplary embodiment of a failed retrieval where an old manifest has been returned. In this design 400, metadata 401, FIG. 5, 501 metadata include pointers to a manifest 502 and that manifest 502 points to a vessel 503. FIG. 6, 601 metadata include pointers to an old manifest 602 and that manifest points to a vessel 603. In removing data from a vessel, normally the vessel in question is read back and any data no longer needed is removed as shown in FIG. 5, 503. This vessel 503 is then given a new vessel name with a different identification. The manifest file 502 still has the same identification and name as the old one FIG. 6, 602. In this case, the old manifest points to a vessel that has been deleted and no longer exists. The new manifest now points to the new vessel 603. The old vessel 503 is then deleted. If the new manifest file 502 is properly retrieved, it will now point to the new vessel 603. However if the old manifest 602 is retrieved because of stale access, the old vessel 503 will likely be unavailable because it was deleted and an error condition will occur.

Figure 7:
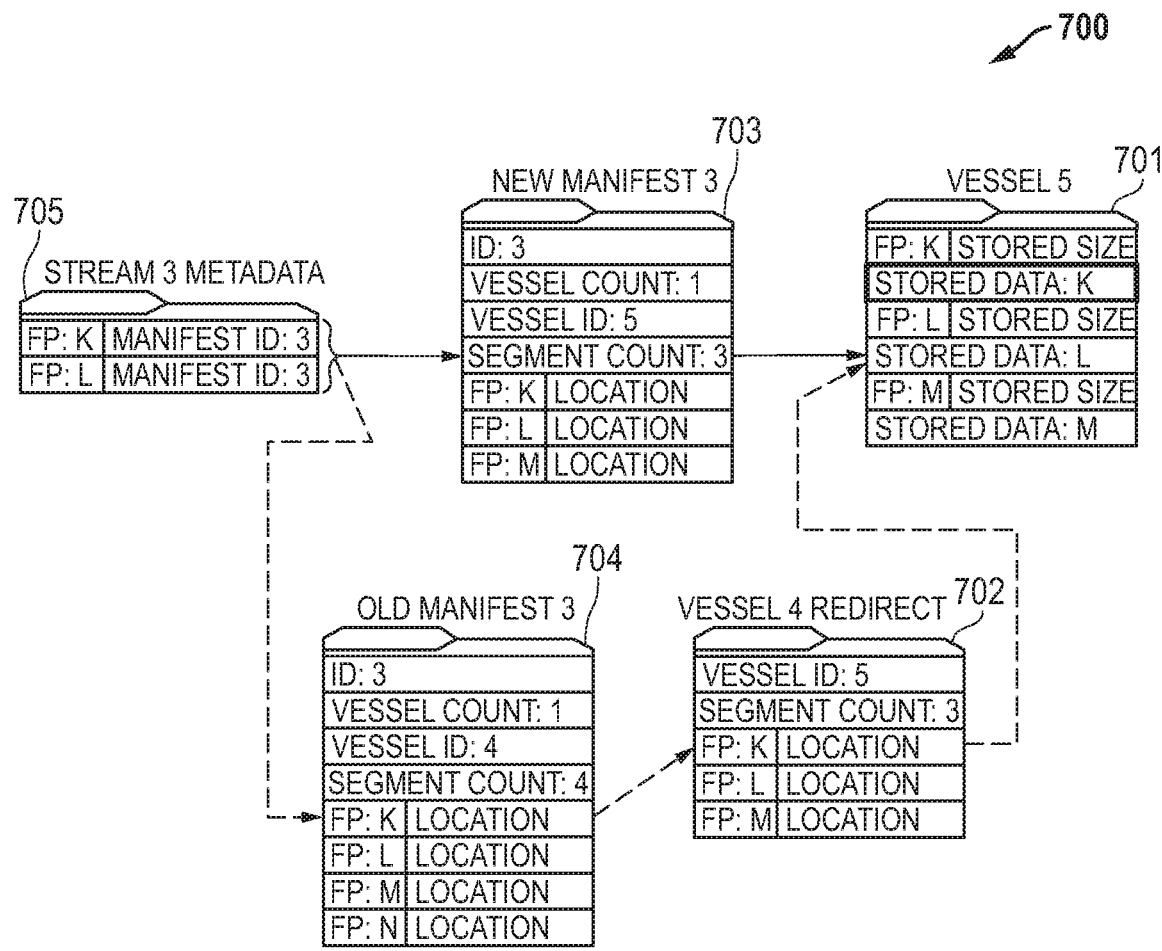
FIG. 7 is an overview of an exemplary embodiment of a data deduplication architecture diagram.

FIG. 7 is an overview of an exemplary embodiment of a data deduplication architecture diagram that depicts a successful retrieval where both manifests have been retrieved. In the present embodiment 700, removing data from a vessel, the process is as follows. The vessel in question 702 is accessed and data within that vessel that is no longer needed is deleted. A new vessel with a different name is saved with a different identification and name 701. A stub vessel file 702 is saved with a variation of the name of the name of the old vessel and may have an expiration date. This stub vessel file 702 indicates that the vessel no longer exists and contains redirection information to the new vessel 701. Stream 3 metadata 705 is incorporated into the new manifest 3 file 703. A new manifest file 703 is saved with the same identification and name as the old manifest file 704. The new manifest 703 now points to the new vessel 701. The old vessel 702 may be deleted. If the new manifest file 703 is properly retrieved, it will point to the new vessel 701. If the old manifest 704 is retrieved because of lack of consistency, the retrieval code will attempt to retrieve the old vessel. If the old vessel 702 is retrieved (because of inconsistency), the data is taken from there. In this example, the old vessel 702 is now a stub vessel 792 that points to vessel 701 which contains the most current data. That redirection stub 702 will point to the new vessel 701 which contains the most current data and it will be retrieved. In either case, where the old manifest 404 or the new manifest 703 is retrieved, it will ultimately point to the most current data in vessel 701.

Figure 8A:
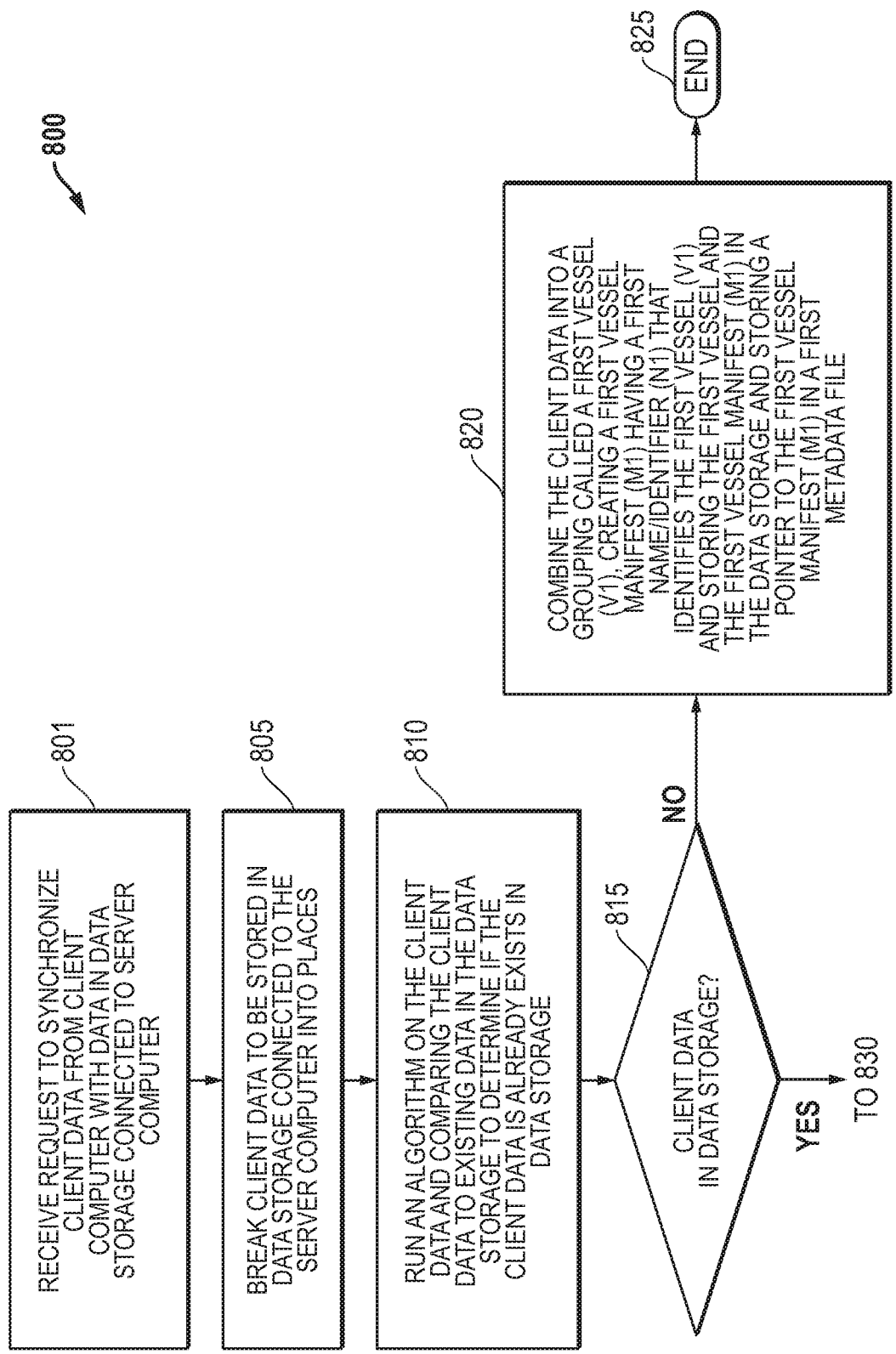

FIGS. 8a and 8b are flowcharts of an exemplary embodiment of a data deduplication system for eventual consistency object storage. A computer-implemented method for synchronizing data between a server computer, a client computer and data storage accessible to the server computer to provide a strongly consistent data repository is shown 800. When a request is received to synchronize client data on the client computer with data in the data storage connected to the server computer 801, client data to be stored in the data storage connected to the server computer is broken into pieces 805. Using the server computer, an algorithm is run on the client data and comparing the client data to existing data in the data storage to determine if the client data is already exists in data storage 810. If the client data is not present in data storage 815, the client data is combined into a grouping called a first vessel (V1), a first vessel manifest (M1) is created having a first name/identifier (N1) that identifies the first vessel (V1) and the first vessel is stored and the first vessel manifest (M1) in the data storage a pointer is stored to the first vessel manifest (M1) in a first metadata file 820 and processing ends 825. If the client data is present in data storage 815, the contents of the client data are compared to existing data to determine if the client data needs to be revised and if so, a second vessel (V2) is created and the client data is stored in the second vessel (V2) and a second vessel manifest (M2) is created having the same first name/identifier (N1a) but its contents identify the second vessel (V2) 830. A stub redirect vessel (V3) is created having a redirect vessel name/identifier that describes the data in the second vessel (V2) 835. The second vessel (V2) is deleted 840.

When data that has been modified and stored in a vessel selected from the group consisting of a first or second vessel (V1, V2) is to be retrieved 845, the first name/identifier is accessed (N1 that may be M2 or M1) 850. If the same first name/identifier (N1) identifies the second manifest (M2) 855, an attempt is made to retrieve the data from the second vessel (V2) and if this retrieval succeeds, the data in the second vessel (V2) is valid 865 and processing ends 875. If the same first name/identifier (N1) identifies the first manifest (M1) 860, an attempt is made to retrieve the data from the first vessel (V1) and if this retrieval succeeds, the data in the first vessel (V1) is valid and retrieving data from the first vessel (V1) 870. If the same first name/identifier (N1) identifies the first manifest (M1), an attempt is made to retrieve the data from the first vessel (V1) and if this retrieval fails, the data in the first vessel (V1) was deleted and the stub redirect vessel (V3) is accessed which describes the data in the second vessel (V2) and the data is retrieved from the second vessel (V2) and processing end 875.

Although the present invention has been described in detail with reference to certain preferred embodiments, it should be apparent that modifications and adaptations to those embodiments might occur to persons skilled in the art without departing from the spirit and scope of the present invention.

The invention claimed is:

1. A computer-implemented method for synchronizing data between a server computer, a client computer and data storage accessible to the server computer to provide a strongly consistent data repository, the method comprising:
receiving a request to synchronize client data on the client computer with data in the data storage connected to the server computer;
breaking the client data to be stored in the data storage connected to the server computer into pieces;
using the server computer, running an algorithm on the client data and comparing the client data to existing data in the data storage to determine if the client data already exists in the data storage;
if the client data is not present in the data storage, combining the client data into a grouping called a first vessel (V1), creating a first vessel manifest (M1) having a first identifier (N1) that identifies the first vessel (V1) and storing the first vessel and the first vessel manifest (M1) in the data storage and storing a pointer to the first vessel manifest (M1) in a first metadata file; and
if the client data is present in the data storage:
comparing the contents of the client data to the existing data to determine if the client data needs to be revised; if so, creating a second vessel (V2) and storing the client data in the second vessel (V2) and creating a second vessel manifest (M2) having the same first identifier (N1) but the contents of the second vessel manifest identify the second vessel (V2); and if the client data does not need to be revised, no further action taken;
creating a stub redirect vessel (V3) having a redirect vessel identifier that describes the data in the second vessel (V2); and
deleting the first vessel (V1).

2. A computer-implemented method for synchronizing data between a server computer, a client computer and data storage accessible to the server computer to provide a strongly consistent data repository according to claim 1, the method further comprising:
retrieving data that has been modified and stored in a vessel selected from the group consisting of the first and second vessel (V1, V2) comprising:
accessing a first identifier (N1) for the selected vessel;
determining if the same first identifier (N1) identifies the second manifest (M2) or the first manifest (M1);
if the same first identifier (N1) identifies the second manifest (M2), attempting to retrieve the data from the second vessel (V2) and if this retrieval succeeds, concluding that the data in the second vessel (V2) is valid;
if the same first identifier (N1) identifies the second manifest (M2), attempting to retrieve the data from the second vessel (V2) and if this retrieval fails, concluding that the data in the second vessel (V2) is invalid,
if the same first identifier (N1) identifies the first manifest (M1) attempting to retrieve the data from the first vessel (V1) and if this retrieval succeeds, concluding that the data in the first vessel (V1) is valid and retrieving data from the first vessel (V1); and
if the same first identifier (N1) identifies the first manifest (M1), attempting to retrieve the data from the first vessel (V1) and if this retrieval fails, concluding that the data in the first vessel (V1) was deleted and accessing the stub redirect vessel (V3) which describes the data in the second vessel (V2) and retrieving the data from the second vessel (V2).

3. A computer-implemented method for synchronizing data between a server computer, a client computer and data storage accessible to the server computer to provide a strongly consistent data repository, the method comprising:
receiving a request to synchronize client data on the client computer with data in the data storage connected to the server computer;
breaking the client data to be stored in the data storage connected to the server computer into pieces;
using the server computer, running an algorithm on the client data and comparing the client data to existing data in the data storage to determine if the client data already exists in the data storage;
if the client data is not present in the data storage, combining the client data into a grouping called a first vessel (V1), creating a first vessel manifest (M1) having a first identifier (N1) that identifies the first vessel (V1) and storing the first vessel and the first vessel manifest (M1) in the data storage and storing a pointer to the first vessel manifest (M1) in a first metadata file; and if the client data is present in the data storage:
comparing the contents of the client data to the existing data to determine if the client data needs to be revised; if so, creating a second vessel (V2) and storing the client data in the second vessel (V2) and creating a second vessel manifest (M2) having the same first identifier (N1) but the contents of the second vessel manifest identify the second vessel (V2); and if the client data does not need to be revised, no further action is taken;
creating a stub redirect vessel (V3) having a redirect vessel identifier that describes the data in the second vessel (V2);
deleting the first vessel (V1);
retrieving data that has been modified and stored in a vessel selected from the group consisting of the first and second vessel (V1, V2) comprising:
 accessing the first identifier (N1 that may be M2 or M1);
 if the same first identifier (N1) identifies the second manifest (M2), attempting to retrieve the data from the second vessel (V2) and if this retrieval succeeds, concluding that the data in the second vessel (V2) is valid;
 if the same first identifier (N1) identifies the first manifest (M1), attempting to retrieve the data from the first vessel (V1) and if this retrieval succeeds concluding that the data in the first vessel (V1) is valid and retrieving data from the first vessel (V1); and
 if the same first identifier (N1) identifies the first manifest (M1), attempting to retrieve the data from the first vessel (V1) and if this retrieval fails, concluding that the data in the first vessel (V1) was deleted and accessing the stub redirect vessel (V3) which describes the data in the second vessel (V2) and retrieving the data from the second vessel (V2).

4. A computer system comprising:
a server computer;
a client computer;
data storage accessible to the server computer;
wherein the memory stores a program that synchronizes data between the server computer, the client computer and the data storage accessible to the server computer to provide a strongly consistent data repository, when executed by the server computer cause the server computer to:
 receive a request to synchronize client data on the client computer with data in the data storage connected to the server computer;
 break the client data to be stored in the data storage connected to the server computer into pieces;
 use the server computer, run an algorithm on the client data and compare the client data to existing data in the data storage to determine if the client data already exists in the data storage;
 if the client data is not present in the data storage, combine the client data into a grouping called a first vessel (V1), create a first vessel manifest (Ml) having a first identifier (N1) that identifies the first vessel (V1) and store the first vessel and the first vessel manifest (M1) in the data storage and store a pointer to the first vessel manifest (M1) in a first metadata file; and
 if the client data is present in the data storage:
  compare the contents of the client data to existing data to determine if the client data needs to be revised, if so, create a second vessel (V2) and store the client data in the second vessel (V2) and create a second vessel manifest (M2) having the same first identifier (N1) but the contents of the second vessel manifest identify the second vessel (V2); and if the client data does not need to be revised, no further action is taken,
  create a stub redirect vessel (V3) having a redirect vessel identifier that describes the data in the second vessel (V2); and
  delete the first vessel (V1).

5. A computer system according to claim 4, wherein the program further comprises:
 retrieve data that has been modified and stored in a vessel selected from the group consisting of the first and second vessel (V1, V2) comprising:
  access the first identifier (N1 that may be M2 or M1);
  if the same first identifier (N1) identifies the second manifest (M2), attempt to retrieve the data from the second vessel (V2) and if this retrieval succeeds, concluding that the data in the second vessel (V2) is valid;
  if the same first identifier (N1) identifies the first manifest (M1), attempt to retrieve the data from the first vessel (V1) and if this retrieval succeeds, concluding that the data in the first vessel (V1) is valid and retrieve data from the first vessel (V1); and
  if the same first identifier (N1) identifies the first manifest (M1), attempt to retrieve the data from the first vessel (V1) and if this retrieval fails, concluding that the data in the first vessel (V1) was deleted and access the stub redirect vessel (V3) which describes the data in the second vessel (V2) and retrieve the data from the second vessel (V2).

* * * * *